(12) United States Patent  
Yamada

(10) Patent No.: US 9,817,351 B2  
(45) Date of Patent: Nov. 14, 2017

(54) IMAGE FORMING APPARATUS

(71) Applicant: CANON KABUSHIKI KAISHA, Tokyo (JP)

(72) Inventor: Masakatsu Yamada, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/203,516

(22) Filed: Jul. 6, 2016

(65) Prior Publication Data  
US 2017/0017184 A1 Jan. 19, 2017

(30) Foreign Application Priority Data  
Jul. 14, 2015 (JP) ................................. 2015-140518

(51) Int. Cl.  
*G03G 15/00* (2006.01)  
*H04N 1/00* (2006.01)

(52) U.S. Cl.  
CPC ....... *G03G 15/5016* (2013.01); *H04N 1/0035* (2013.01); *H04N 1/00103* (2013.01); *H04N 1/00315* (2013.01); *H04N 1/00384* (2013.01)

(58) Field of Classification Search  
None  
See application file for complete search history.

(56) References Cited

U.S. PATENT DOCUMENTS

| | | |
|---|---|---|
| 9,092,178 B2 | 7/2015 | Aritomi |
| 9,106,779 B2 | 8/2015 | Tsujimoto |
| 2006/0133840 A1* | 6/2006 | Yoshida .............. G03G 15/5016 399/81 |
| 2007/0165262 A1* | 7/2007 | Watanabe .......... G03G 15/5016 358/1.14 |
| 2008/0088869 A1* | 4/2008 | Unno ..................... B41J 11/009 358/1.15 |
| 2008/0291283 A1 | 11/2008 | Achiwa |
| 2014/0132652 A1 | 5/2014 | Nakamura |

(Continued)

FOREIGN PATENT DOCUMENTS

| | | |
|---|---|---|
| EP | 2 330 608 | 8/2011 |
| EP | 2 455 814 | 5/2012 |

(Continued)

OTHER PUBLICATIONS

European Search Report dated Nov. 23, 2016 during prosecution of related European application No. 16178785.8.

*Primary Examiner* — Thomas Giampaolo, II  
(74) *Attorney, Agent, or Firm* — Fitzpatrick, Cella, Harper & Scinto

(57) ABSTRACT

An image forming apparatus includes: an image forming portion capable of forming an image on a recording medium; an operation portion for performing an operation of the image forming apparatus; a push button which is arranged in a surface of the operation portion, and with which a signal of stopping an image forming action performed by the image forming portion is input; a receiving portion provided in the operation portion so as to be able to receive a radio signal from a communication component by placing the communication component transmitting the radio signal so as to face the receiving portion; and at least a central portion of the push button located at a position recessed from the surface of the operation portion.

10 Claims, 11 Drawing Sheets

(56) References Cited

U.S. PATENT DOCUMENTS

2014/0253963 A1   9/2014  Aoyama
2014/0327926 A1  11/2014  Katsuyama

FOREIGN PATENT DOCUMENTS

| EP | 2 677 466 | 12/2013 |
| JP | 2010-114784 | 5/2010 |
| JP | 2014-157532 | 8/2014 |
| JP | 2014-171156 | 9/2014 |

* cited by examiner

IMAGE FORMING APPARATUS

BACKGROUND OF THE INVENTION

Field of the Invention

The present invention relates to an image forming apparatus such as a printer, facsimile machine, or copier.

Description of the Related Art

An image forming apparatus which forms an image such as a character, a picture, or a photograph on a recording medium is widely used. In a surface of an operation portion of the image forming apparatus, there is arranged a push button for use in inputting a signal for stopping (or starting) an image forming action.

In the image forming apparatus, there has been developed a technique of inputting print data by using near field communication. Japanese Patent Application Laid-Open No. 2014-157532 discloses a printing system which forms an image by inputting print data into an image forming apparatus by using near field communication from an electronic camera, a mobile phone terminal, a tablet personal computer or the like.

In the case of inputting print data into an image forming apparatus by using near field communication, a user needs to be authenticated by the image forming apparatus while holding an equipment body, from which the print data is to be transmitted, or an authentication medium such as an IC card close to a receiving portion of the image forming apparatus. As disclosed in Japanese Patent Application Laid-Open No. 2014-157532, the receiving portion is arranged in an operation portion where a push button related to the start or stop of an image forming action is provided.

Therefore, when bringing the equipment body or the authentication medium close to the receiving portion, the user might push the push button related to the start or stop of an image forming action by mistake, which leads to an input of an instruction related to the start or stop of the image forming action unfavorably.

SUMMARY OF THE INVENTION

Therefore, it is an object of the present invention to provide an image forming apparatus capable of reducing opportunities of pushing a push button related to the start or stop of an image forming action even in the case of bringing a communication component close to an operation portion when performing near field communication.

According to an aspect of the present invention, there is provided an image forming apparatus including: an image forming portion capable of forming an image on a recording medium; an operation portion for performing an operation of the image forming apparatus; a push button which is arranged in a surface of the operation portion, and with which a signal of stopping an image forming action performed by the image forming portion is input; a receiving portion provided in the operation portion so as to be able to receive a radio signal from a communication component by placing the communication component transmitting the radio signal so as to face the receiving portion; and at least a central portion of the push button located at a position recessed from the surface of the operation portion.

According to another aspect of the present invention, there is provided an image forming apparatus including: an image forming portion capable of forming an image on a recording medium; an operation portion for performing an operation of the image forming apparatus; a push button which is arranged in a surface of the operation portion, and with which a signal of starting an image forming action performed by the image forming portion is input; a receiving portion provided in the operation portion so as to be able to receive a radio signal from a communication component by placing the communication component transmitting the radio signal so as to face the receiving portion; and at least a central portion of the push button located at a position recessed from the surface of the operation portion.

Further features of the present invention will become apparent from the following description of exemplary embodiments with reference to the attached drawings.

DESCRIPTION OF THE EMBODIMENTS

Embodiments of the present invention will now be described in detail in accordance with the drawings.

[First Embodiment]

(Image Forming Apparatus)

Figure 1:
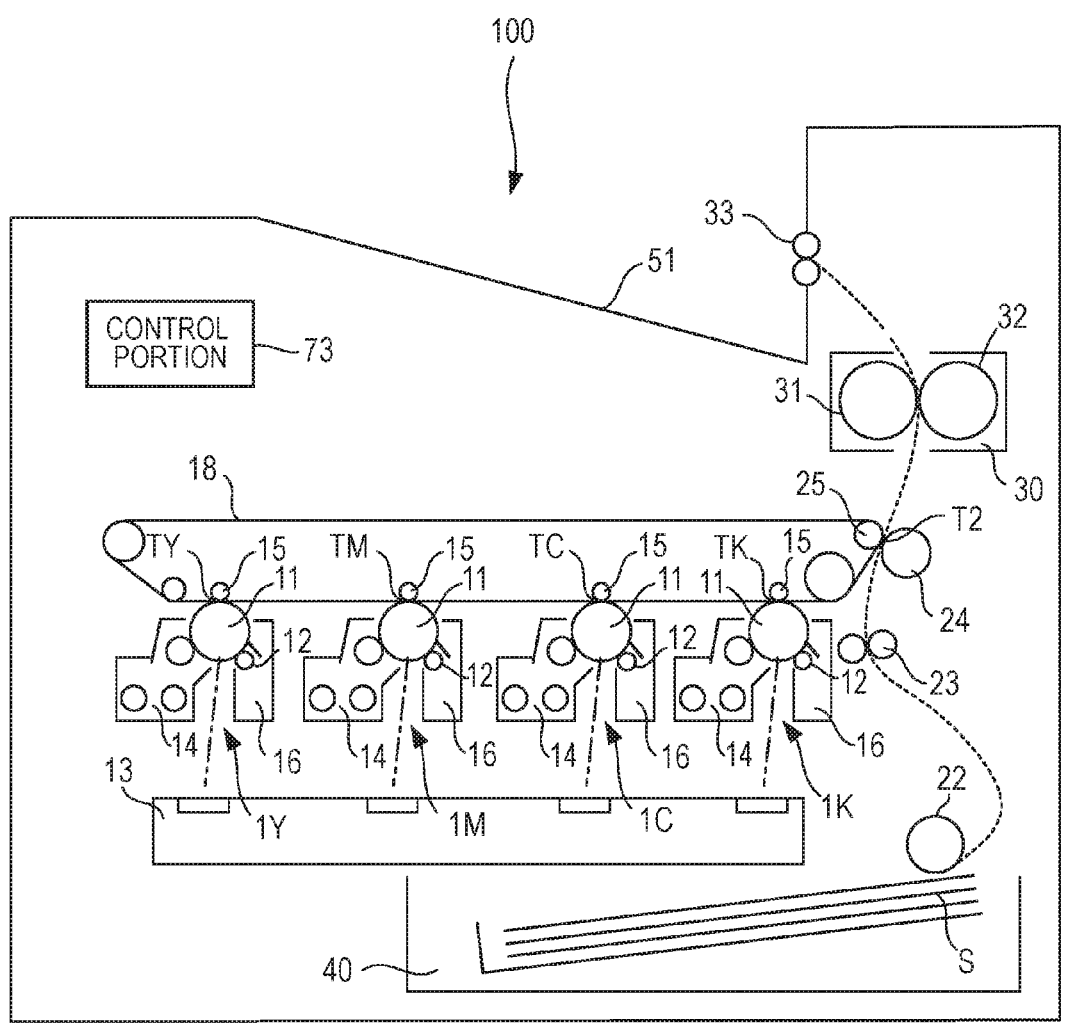
FIG. 1 is an explanatory diagram illustrating a configuration of an image forming apparatus according to a first embodiment.

FIG. 1 is an explanatory diagram illustrating a configuration of an image forming apparatus according to a first embodiment. As illustrated in FIG. 1, an image forming apparatus 100 is an intermediate transfer type full-color laser beam printer which forms an image by an electrophotographic system.

Image forming portions 1Y, 1M, 1C, and 1K, which are examples of an image forming portion, an intermediate transfer belt 18, a secondary transfer outer roller 24, and a fixing device 30 are able to form an image on a recording medium. The image forming portion 1Y forms a yellow toner image on a photosensitive drum 11 and transfers the toner image onto the intermediate transfer belt 18. The image forming portion 1M forms a magenta toner image on the photosensitive drum 11 and transfers the toner image onto the intermediate transfer belt 18. The image forming portions 1C and 1K form a cyan toner image and a black toner image on the photosensitive drum 11, respectively, and transfer the respective toner images onto the intermediate transfer belt 18.

The four-color toner images transferred to the intermediate transfer belt 18 are conveyed to a secondary transfer part T2 and then transferred to a sheet S. A cassette 40 accommodates stacked sheets. A feed roller 22 separates the top sheet S and feeds the sheet S into a registration roller 23. The registration roller 23 corrects the skew of the sheet and feeds the sheet to the secondary transfer part T2 while matching the timing with the toner images on the intermediate transfer belt 18.

The secondary transfer outer roller 24 is brought into contact with the intermediate transfer belt 18 on the secondary transfer inner roller 25 to form the secondary transfer part T2. A DC voltage is applied to the secondary transfer outer roller 24, by which the toner images carried on the intermediate transfer belt 18 are transferred to the sheet S. The sheet S to which the toner images are transferred is conveyed to the fixing device 30 and then heated and pressed so that the images are fixed to the sheet S. Thereafter, the sheet S is discharged to a discharge tray 51 by a discharge roller 33.

(Image Forming Portion)

The image forming portions 1Y, 1M, 1C, and 1K have substantially the same configuration, though they are different from each other in the color of toner used in the developing device 14. Therefore, the image forming portion 1Y will be described here and duplicate description related to the image forming portions 1M, 1C, and 1K is omitted.

In the image forming portion 1Y, a charging roller 12, an exposure device 13, a developing device 14, a transfer roller 15, and a drum cleaning device 16 are arranged around the photosensitive drum 11.

In the photosensitive drum 11, a photosensitive layer is formed on the surface of the base of a metal pipe. The charging roller 12 electrically charges the photosensitive drum 11 to a uniform potential due to application of an oscillation voltage to the charging roller 12, where the oscillation voltage is generated by superposing an AC voltage on a DC voltage. The exposure device 13 forms an electrostatic latent image on the photosensitive drum 11 by scanning the photosensitive layer with a laser beam to expose the photosensitive layer.

The developing device 14 develops the electrostatic latent image on the photosensitive drum 11 to toner images by using a two-component developer. Upon application of a DC voltage to the transfer roller 15, the transfer roller 15 transfers the toner images carried on the photosensitive drum 11 to the intermediate transfer belt 18. The drum cleaning device 16 frictionally slides the cleaning blade on the photosensitive drum 11 to collect transfer residual toner on the photosensitive drum 11.

(Arrangement of Operation Portion)

Figure 2:
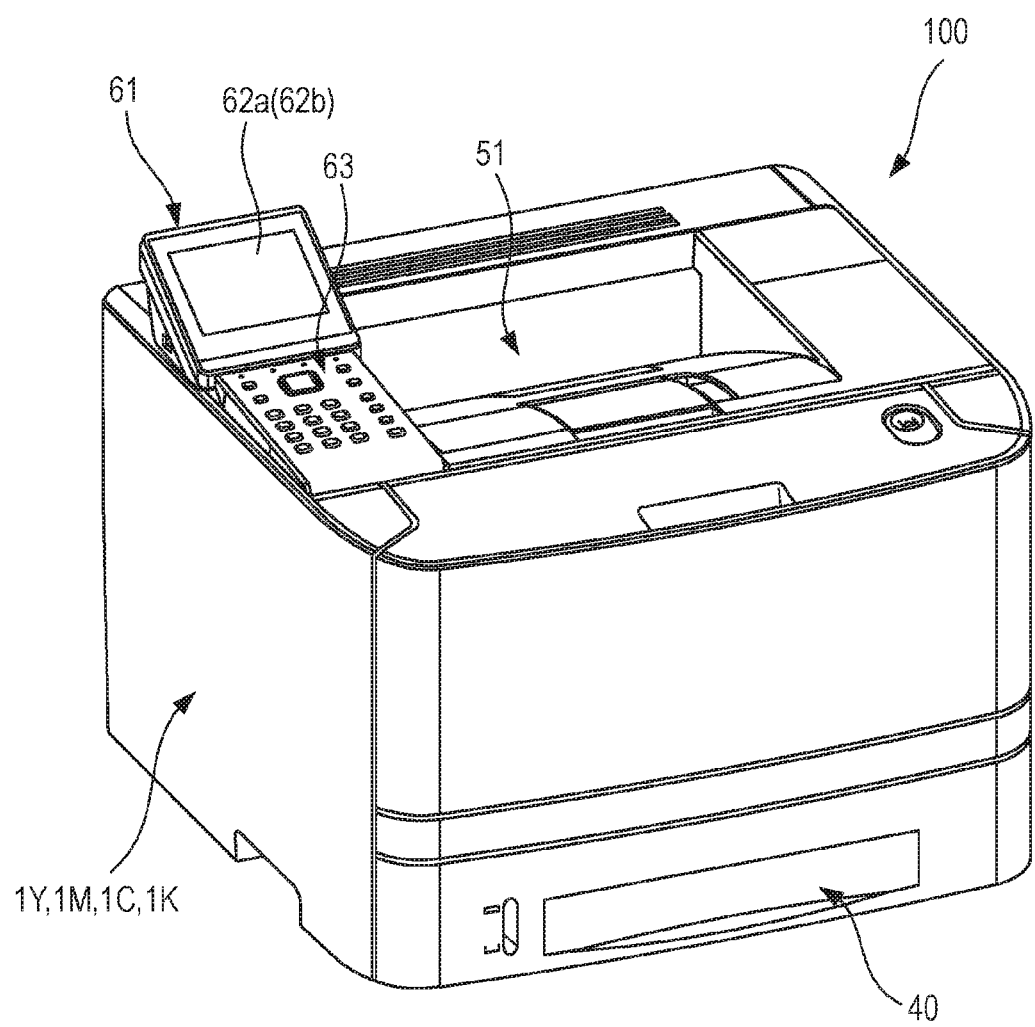
FIG. 2 is a perspective view illustrating an appearance of the image forming apparatus.

FIG. 2 is a perspective view illustrating an appearance of the image forming apparatus. As illustrated in FIG. 2, the image forming apparatus 100 includes the cassette 40 for accommodating sheets in the lower part. In the upper part of the image forming apparatus 100, the image forming apparatus 100 includes the discharge tray 51 for stacking sheets on which the images are formed.

An operation portion 61 is provided beside the discharge tray 51 on the upper surface of the image forming apparatus 100. In the operation portion 61, an input operation portion 63 for performing various inputs is arranged on the near side of a liquid crystal screen 62a for performing various displays. The liquid crystal screen 62a displays the state of the power supply of the image forming apparatus 100, the presence/absence of a job, an error condition or the like.

On the surface of the liquid crystal screen 62a, a transparent touch panel 62b is provided. The setting contents such as the number of processed sheets, the kind of sheet, temperature, humidity, and the like displayed on the liquid crystal screen 62a are able to be changed by a touch panel 62b through icons displayed on the liquid crystal screen 62a.

Through the liquid crystal screen 62a where the touch panel 62b is provided, operations and settings for a printer are able to be performed such as network settings, job deletion, or various settings.

(Authentication through Near Field Communication)

Figure 3:
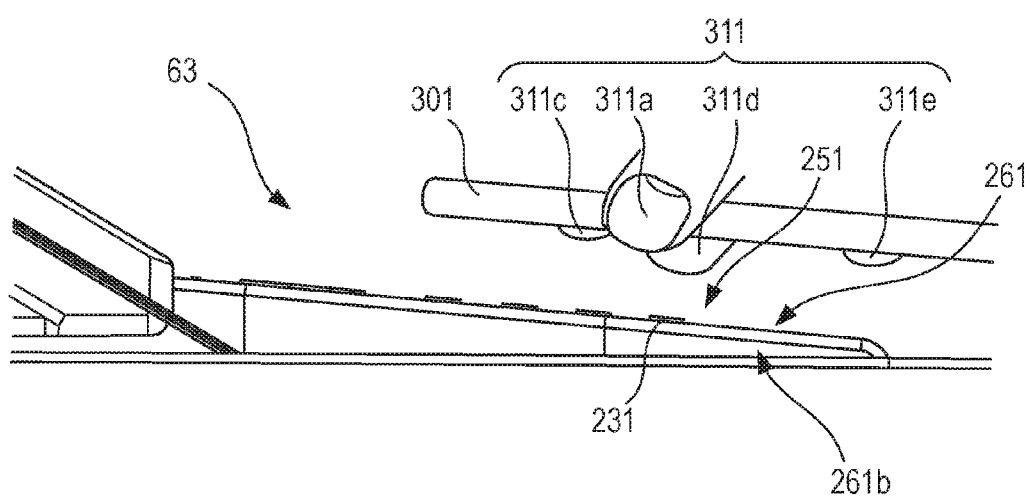
FIG. 3 is an explanatory diagram illustrating an authentication operation using an authentication medium.

FIG. 3 is an explanatory diagram illustrating an authentication operation performed with a mobile terminal brought close to the input operation portion. As illustrated in FIG. 3, the image forming apparatus 100 is able to perform wireless communication through near field communication (NFC) between a mobile terminal (communication component) 301 and an antenna 261b. The mobile terminal 301 receives an image forming job including image data and various types of setting data through near field communication. The image forming apparatus 100 is able to perform remote control through near field communication by using the mobile terminal 301.

The image forming apparatus 100 has an authentication function using near field communication so as to be able to identify an individual from the viewpoint of security to simplify the operation so that the operation can be conveniently performed.

In the near field communication, the communication distance is limited to 10 cm or so and therefore the authentication of the mobile terminal 301 is performed with the mobile terminal 301 "held over" the input operation portion 63. After the authentication, data transfer of the image forming job is performed from the mobile terminal 301 to the image forming apparatus 100. The data of the image forming job is data for one printing unit, and includes data of one or more images, printing condition specification data, and a print command.

(Input Operation Portion)

Figure 4:
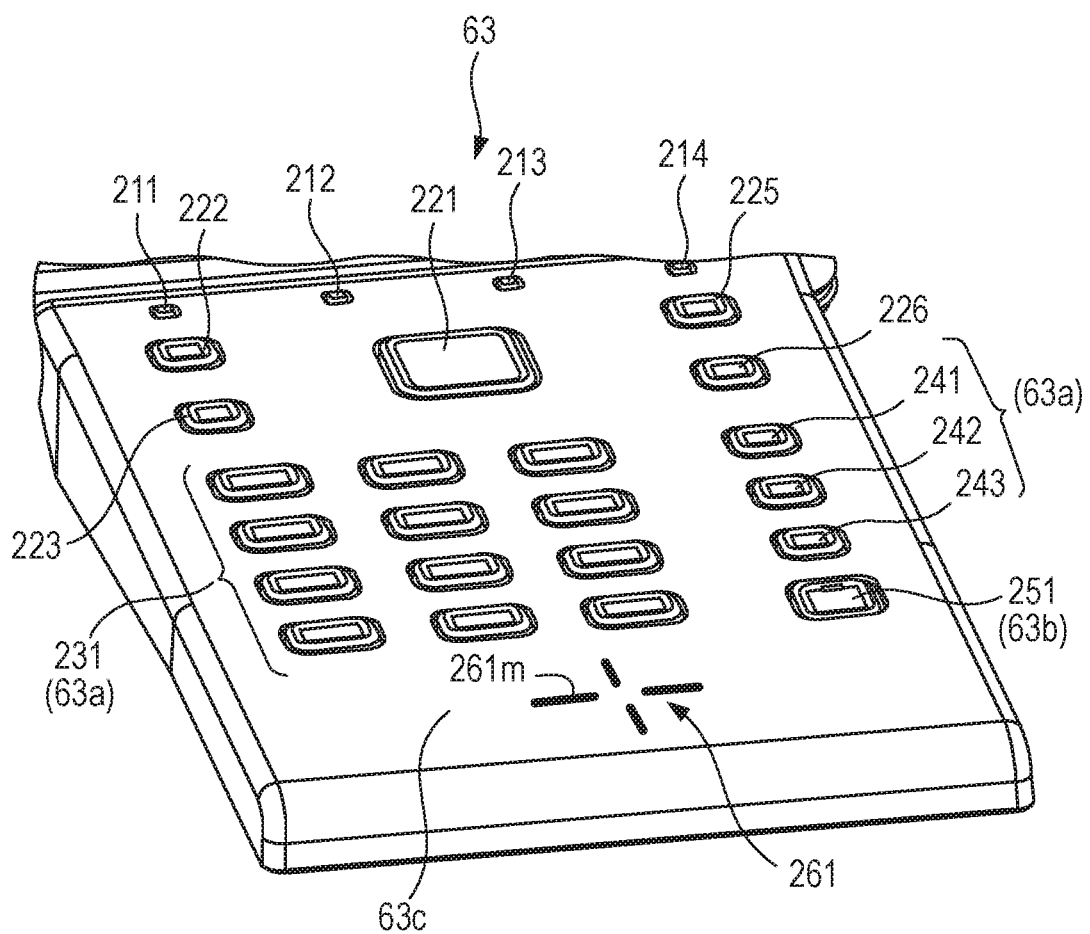
FIG. 4 is an explanatory diagram illustrating a key arrangement in an input operation portion.
Figure 5:
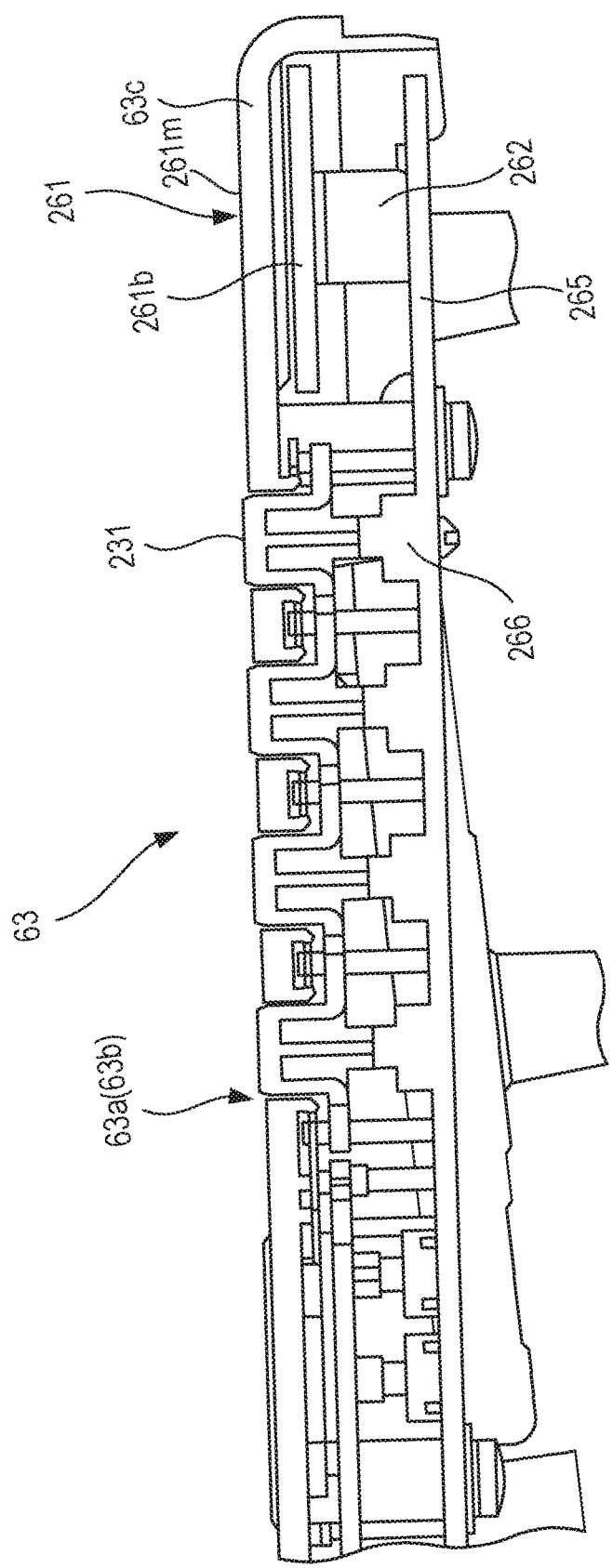
FIG. 5 is an explanatory diagram illustrating an antenna arrangement in a vertical section of the input operation portion.

FIG. 4 is an explanatory diagram illustrating a key arrangement in the input operation portion. FIG. 5 is an explanatory diagram illustrating an antenna arrangement in a vertical section of the input operation portion.

As illustrated in FIG. 4, an antenna portion 261 is arranged in a near side position on a panel cover 63c of the input operation portion 63. On the panel cover 63c, a cross-shaped indicator 261m is printed where the indicator 261m serves as a marker when bringing the mobile terminal (301: FIG. 3) into close. In the input operation portion 63, the indicator 261m is provided in a position where the mobile terminal 301 is positioned to face the antenna portion 261 so that the antenna portion 261 is able to receive a radio signal.

As illustrated in FIG. 5, the antenna 261b, which performs wireless communication with the mobile terminal (301: FIG. 3), is placed just beneath the indicator 261m of the antenna portion 261. The antenna 261b is arranged under the panel cover 63c. The antenna portion 261, which is an example of a receiving portion, is provided in the input operation portion 63 so as to be able to receive a radio signal from the mobile terminal 301 by causing the mobile terminal 301, which is an example of a component of transmitting the radio signal, to face the surface of the input operation portion 63.

As illustrated in FIG. 4, LED lamps (211 to 214) for performing various displays are laid out on the panel cover 63c of the input operation portion 63. The data display portion 211 displays the action of a job or the presence/absence of a job by turning on/off or blinking the LED lamp. The wireless LAN display portion 212 displays a state of the wireless LAN by blinking the LED lamp. The error display portion 213 indicates an error by turning on the LED lamp. The power display portion 214 displays the ON/OFF state of the power supply by turning on/off the LED lamp.

(Setting Key and Execution Key)

As illustrated in FIG. 4, the input operation portion 63, which is an example of an operation portion, is provided for a user to perform operations of the image forming apparatus 100. On the panel cover 63c of the input operation portion 63, there are laid out setting keys 63a (241 to 243) related to setting input and screen operations and an execution key 63b (an image formation start button 251) for starting an action of the image forming apparatus 100.

(1) A home key 221 is pressed to return the display of the liquid crystal screen 62a to the home screen.

(2) A reset key 222 is pressed to reset the set contents displayed on the liquid crystal screen 62a to default values.

(3) A back key 223 is pressed to return the display of the liquid crystal screen 62a to the screen which is one level upper in the hierarchy.

(4) A power saving key 225 is pressed to shift to a power saving mode and is pressed again to recover from the power saving mode.

(5) A status confirmation key 226 is pressed to display a print status and a report output status on the liquid crystal screen 62a for confirmation.

(6) Any key of the numeric keypad 231 is pressed to input a numeral, a symbol, or a character in a cursor position displayed on the liquid crystal screen 62a. The key of the numeric keypad 231, which is an example of a second push button, is a button for inputting a numerical value and therefore is provided to input a signal for an operation other than the stop and start of the image forming action.

(7) An authentication key 241 is pressed to cause the display of the liquid crystal screen 62a to enter a password mode for inputting a password number or to exit the password mode.

(8) A clear key 242 is pressed to clear the numeral or character in the cursor position.

(9) A counter key 243 is pressed to display counter information, which contains a record of how many sheets the image forming apparatus 100 printed, on the liquid crystal screen 62a.

(10) When settings are made on the liquid crystal screen 62a, a virtual setting key, not illustrated, is displayed on the liquid crystal screen 62a. Pressing the virtual setting key with a finger activates the touch panel 62b to generate a required input signal.

(11) When manual start is performed on the liquid crystal screen 62a, a virtual start key, not illustrated, is displayed on the liquid crystal screen 62a. Pressing the virtual start key with a finger activates the touch panel 62b to start the image formation.

(12) A stop key 251 aborts a job and stops the printing action of the image forming apparatus 100. The stop key 251, which is an example of a first push button, is arranged in the surface of the input operation portion 63 and is provided to input a signal of stopping the image forming action.

In an embodiment having a start key, the start key, which is an example of the first push button, is arranged in the surface of the input operation portion 63 and is provided to input a signal of starting the image forming action.

(Authentication Circuit)

Figure 6:
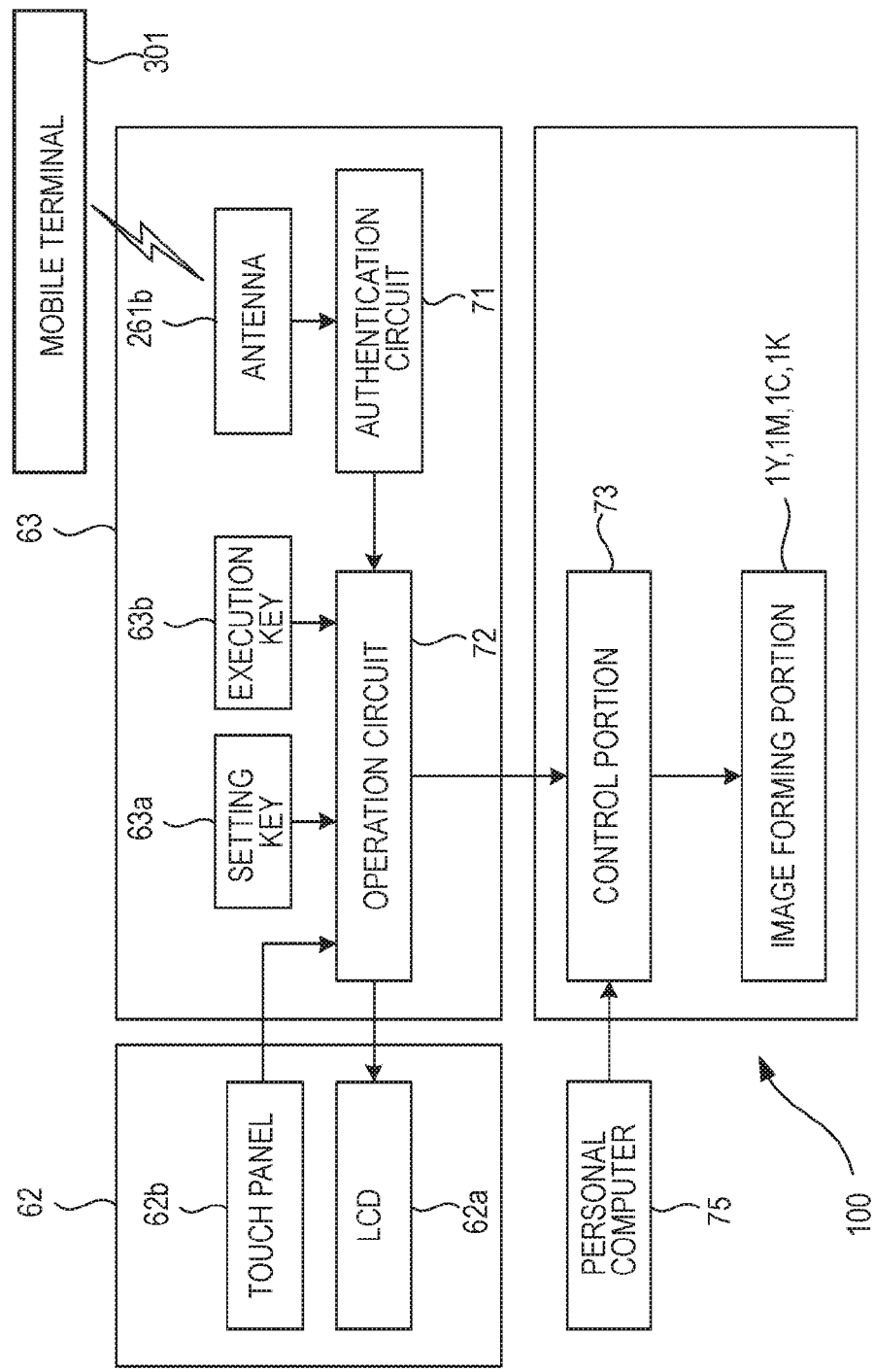
FIG. 6 is a block diagram illustrating a control system of the image forming apparatus.

FIG. 6 is a block diagram illustrating a control system of the image forming apparatus. As illustrated in FIG. 5, a tactile switch 266 is mounted on an operation board 265, where the tactile switch 266 is a switching element for detecting the press of the setting key 63a or the execution key 63b. On the operation board 265, an operation circuit 72 for controlling the image forming apparatus 100 is mounted on the basis of manipulated inputs of the setting key 63a and the execution key 63b as illustrated in FIG. 6.

As illustrated in FIG. 6, an authentication circuit 71 is also mounted on the operation board 265, where the authentication circuit 71 performs authentication by receiving ratio waves of near field communication output from the mobile terminal 301 (FIG. 3) by using the antenna 261b. The antenna 261b is connected to the operation board 265 via a connector 262.

As illustrated in FIG. 6, the liquid crystal screen 62a displays the state of the settings of the image forming portions 1Y, 1M, 1C, and 1K and the action state through the operation circuit 72. The operation circuit 72 receives inputs from the touch panel 62b, the setting key 63a, and the execution key 63b.

A control portion 73 of the image forming apparatus 100 is able to be operated through a personal computer 75 connected by a USB cable, a wired LAN, or a wireless LAN or through the input operation portion 63 provided in the image forming apparatus 100.

The control portion 73 receives an image forming job including image data by the wired LAN or wireless LAN from the personal computer 75. The control portion 73 receives an image forming job including image data by near field communication from the mobile terminal 301. The control portion 73 controls the image forming portions 1Y, 1M, 1C, and 1K to perform the image forming job thereof.

The control portion 73 performs an authentication action for confirming the authority to use the image forming apparatus 100 with the mobile terminal 301 prior to receiving the image forming job.

If the mobile terminal 301 is held close to the antenna 261b as illustrated in FIG. 3, authentication data is stored in the authentication circuit 71 through the antenna 261b from the mobile terminal 301. If an authentication item of the stored authentication data matches an authentication item of the image forming apparatus 100, the authentication circuit 71 authenticates the mobile terminal 301 and transmits an input permit signal to the operation circuit 72.

If the mobile terminal 301 is authenticated, various settings related to image forming conditions are transmitted from the mobile terminal 301 to the antenna 261b and then the various settings are input to the control portion 73 through the operation circuit 72, and are automatically set. This removes the burden of performing manual setting through the operation portion 61.

Subsequently, the authentication circuit 71 transmits data of the image forming job transmitted from the mobile terminal 301 to the operation circuit 72 and then the operation circuit 72 forwards the data to the control portion 73. The control portion 73 holds the data of the setting contents and of the image forming job and then outputs action commands to respective portions of the image forming apparatus 100.

(Arrangement of Stop Key)

As illustrated in FIG. 4, in the input operation portion 63, a key switch is arranged on the panel cover 63c so that a user is able to operate the input operation portion 63 fluently without confusion.

From the viewpoint of human engineering, it is natural and desirable that a series of key operations are performed from the upper left to the lower right. Therefore, in the image forming apparatus 100, the execution key 63b, which is pressed after the various settings are completed, is arranged at the lower right of the input operation portion 63. The stop key is for use in stopping the image forming action and differs from a power key for turning on or off the power supply.

(Arrangement of Antenna)

From the viewpoint of human engineering, the input operation portion 63 and the antenna 261b need to be arranged so as to be close to each other in order to ensure that the user who holds the authentication medium is the same as the user who operates the input operation portion 63. Although it is possible to provide the authentication circuit 71 on a board other than the operation board 265, it is preferable that the distance between the authentication circuit 71 and the operation circuit 72 is shorter. It is also preferable that the number of parts is less. Therefore, the antenna 261b is disposed close to the operation board 265.

For this reason, in the image forming apparatus 100, the antenna 261b is arranged in the nearest position on the near side of the input operation portion 63 and the authentication circuit 71 is provided in the vicinity of the operation circuit 72 on the operation board 265. Therefore, the antenna 261b is provided close to the setting key 63a and the execution key 63b to transmit or receive a radio signal to or from the mobile terminal 301 held with fingers.

(Authentication Control)

Figure 7:
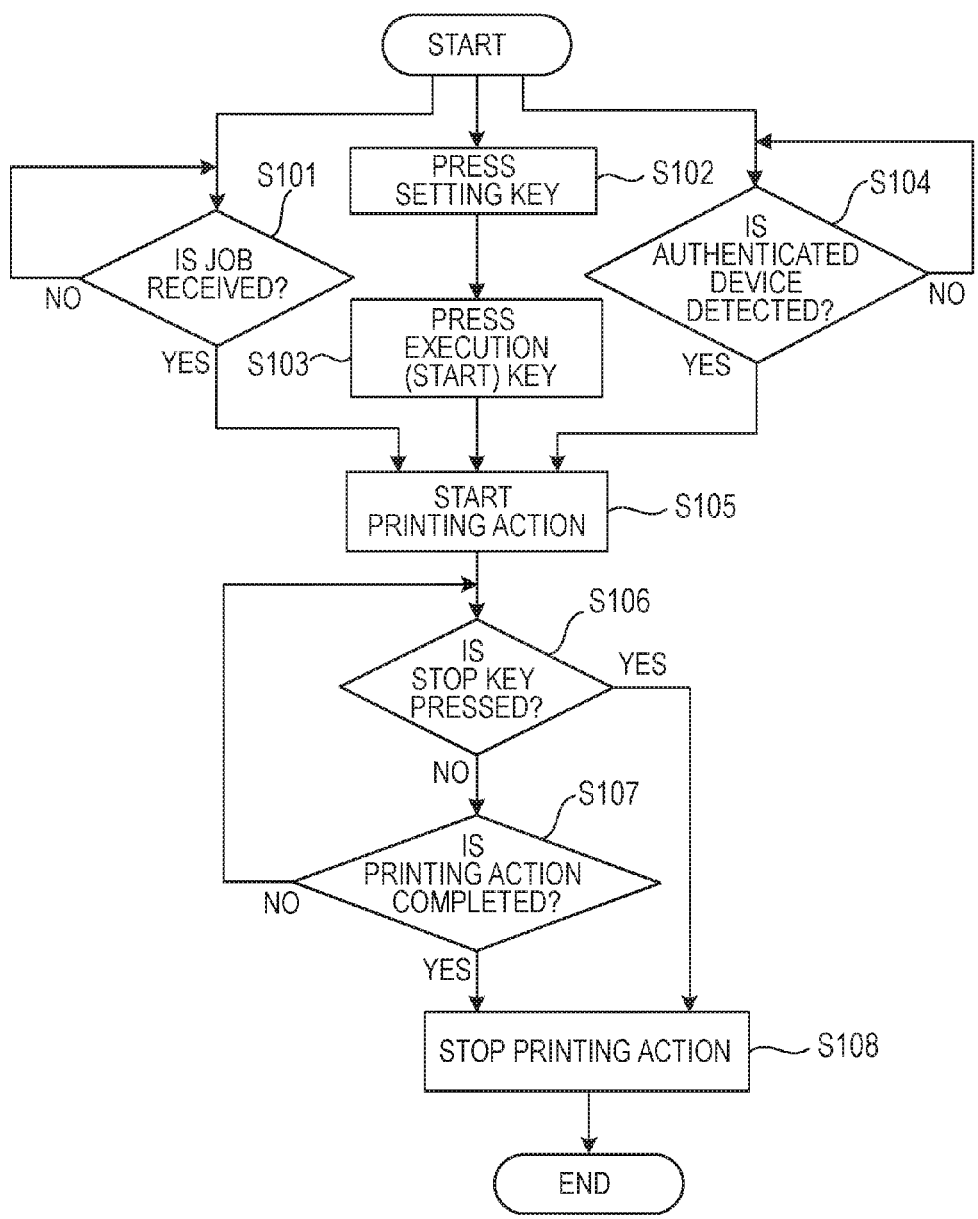
FIG. 7 is a flowchart of authentication control.

FIG. 7 is a flowchart of authentication control. The image forming apparatus 100 has three lines of command for starting a printing action.

As illustrated in FIG. 6, the first line of command is in a case of using a USB cable, a wired LAN, or a wireless LAN. An image forming job is transmitted from a personal computer 75 connected via the USB cable, the wired LAN, or the wireless LAN. Upon receiving the image forming job from the personal computer 75 (S101), the control portion 73 activates the image forming portions 1Y, 1M, 1C, and 1K to start the printing action (S105).

The second line of command is in a case of manually starting a copy process by performing various settings on the liquid crystal screen 62a. A user performs required settings by operating a setting key 63a of the operation portion 61 and a virtual key displayed on the liquid crystal screen 62a (S102). Thereafter, the user presses a virtual start key displayed on the liquid crystal screen 62a with a finger (S103). Thereby, the control portion 73 activates the image forming portions 1Y, 1M, 1C, and 1K to perform the printing action (S105).

The third line of command is in a case of transmitting an image forming job such as photographic printing or the like from the mobile terminal (smartphone) 301. When the mobile terminal 301 is brought close to the operation portion 61, the antenna 261b and the authentication circuit 71 automatically detect the mobile terminal 301 by near field communication, and thereby authentication of the authority to use the image forming apparatus 100 is performed (S104).

If the authentication is completed successfully (YES in S104), the control portion 73 causes the mobile terminal 301 to transmit setting data and image forming job data and stores the setting data and image forming job data to perform the printing action (S105).

Upon starting the printing action (S105), the control portion 73 determines whether or not the stop key 251 is pressed (S106).

If the stop key 251 is pressed after starting the printing action, the control portion 73 stops the printing action (S108). This function is provided for the reason of avoiding unnecessary printing in the case of making a mistake in the number of prints or the like.

If the printing action is completed (YES in S107) without pressing the stop key 251 (NO in S106), the control portion 73 stops the printing action (S108).

(Key Misoperation During Authentication)

As illustrated in FIG. 3, when the user holds the mobile terminal 301 with his/her fingers 311 for authentication, the user's thumb 311a, forefinger not illustrated, middle finger 311c, annular finger 311d, and little finger 311e are protruding from the mobile terminal 301 toward the input operation portion 63 side.

The mobile terminal 301 is able to be authenticated by being brought close to the antenna portion 261 up to approx. 10 cm apart therefrom. Depending on the state of the antenna 261b or on the performance of the mobile terminal 301, however, the user might bring the mobile terminal 301 closer to the antenna portion 261 in some cases. In an extreme case, the user might press the mobile terminal 301 against the input operation portion 63. In such a case, the mobile terminal 301 or any of the user's fingers 311 is likely to touch or press a key of the numeric keypad 231 or the stop key 251 by mistake.

In this case, the setting keys 63a (221 to 243) do not immediately affect the action of the image forming apparatus 100 even in the case of misoperation. The numeric keypad 231 includes the setting keys 63a which is only used to input the settings and do not immediately affect the action of the image forming apparatus 100. Besides the numeric keypad 231, the home key 221, the reset key 222, the back key 223, the power saving key 225, the status confirmation key 226, the keys of the numeric keypad 231, the authentication key 241, the clear key 242, and the counter key 243 are classified into the setting keys 63a. If the power saving key 225 is pressed during printing action, the input thereof is validated after the completion of the printing action, by which the state of the image forming apparatus 100 is changed. Therefore, the power saving key 225 is classified into the setting key 63a.

The execution key 63b (251) immediately affects the action of the image forming apparatus 100 in the case of misoperation. Specifically, if the stop key 251 is erroneously operated, the image forming apparatus 100 stops the reception of the print data and of the action command (job) or stops the image forming job under execution in the image forming apparatus 100 (YES in S106: FIG. 7). Moreover, depending on a program for the image forming apparatus 100, an input of the execution key 63b may cause a display related to the image forming action on the display portion in some cases, though not directly affecting the image forming action immediately. Even in the case of not directly affecting the image forming action, an action causing a new situation related to the image forming action is not desirable for a user.

In the first embodiment, the height of the pressed surface is made different between the setting key and the execution key. At least the central portion of the stop key 251 is located at a position recessed from the surface of the input operation portion 63. Similarly, in the embodiment having the start key, at least the central portion of the start key is located at a position recessed from the surface of the input operation portion 63.

(Height of Pressed Surface)

Figure 8:
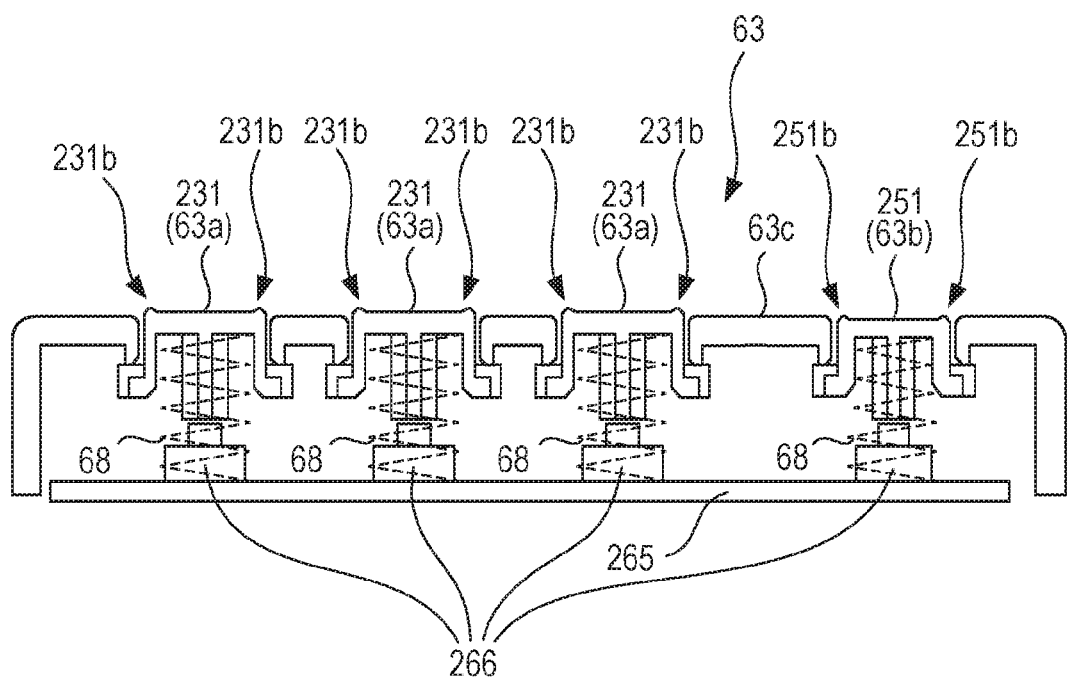
FIG. 8 is a sectional view of an input operation portion according to the first embodiment.

FIG. 8 is a sectional view of the input operation portion according to the first embodiment. As illustrated in FIG. 8, each key of the numeric keypad 231 and the stop key 251 are biased against the operation panel cover 63c with coil springs 68 arranged between each key of the numeric keypad 231 and the operation board 265 and between the stop key 251 and the operation board 265. Therefore, each key of the numeric keypad 231 and the stop key 251 are each held with a fixed gap from the tactile switch 266 mounted on the operation board 265.

If any key of the numeric keypad 231 or the stop key 251 is pressed downward, the gap is closed and then the tactile switch 266 is pressed a predetermined distance. Thereby, the output of the tactile switch 266 is inverted and the input of the key of the numeric keypad 231 or the stop key 251 is validated.

In the first embodiment, the pressed surface of any key of the numeric keypad 231 has an outer peripheral portion around the central portion thereof protruding more than the central portion in the opposite direction to the pressing direction. The pressed surface of the stop key 251 has an outer peripheral portion around the central portion thereof protruding more than the central portion in the opposite direction to the pressing direction. Also in this case, the outer peripheral portion of the pressed surface of the key of the numeric keypad 231 protrudes more than the outer peripheral portion of the pressed surface of the stop key 251 in the opposite direction to the pressing direction, by which misoperation of the stop key 251 less easily occurs than the keys of the numeric keypad 231.

Any key of the numeric keypad 231 has a key height set so that the highest convex portion 231b protrudes more than the surface of the operation panel cover 63c. The key of the numeric keypad 231 can be pressed without being obstructed by the panel cover 63c, and therefore it is easy to validate the input of the key of the numeric keypad 231. On the other hand, the highest convex portion 251b of the stop key 251 is lower than the convex portion 231b of the key of the numeric keypad 231. This prevents the input of a key from being validated even if the stop key 251 is pressed by mistake with the mobile terminal 301 or any of the user's fingers 311 when the user brings the mobile terminal 301 close to the antenna portion 261.

Furthermore, the convex portion of the execution key 63b (stop key 251) is substantially flush with or slightly lower than the surface of the operation panel cover 63c. Thereby, even if the user's fingers 311 come close to the stop key 251 for performing authentication by bringing the mobile terminal 301 close to the antenna portion 261, any of the user's fingers 311 abuts against the operation panel cover 63c. Therefore, the input of the execution key 63b is not easily validated.

The user presses the center of the key when intentionally pressing the stop key 251, and therefore it is not difficult to validate the input of the stop key 251.

In the case where the setting key 63a such as a key of the numeric keypad 231 is pressed by mistake, the key input is invalidated unless the input mode of the setting key 63a has been entered operationally. Even if the input mode has been entered, the operation of the setting key 63a is validated only after pressing "a decision key displayed on the liquid crystal screen 62a" which is used to decide an input with the input contents displayed on the liquid crystal screen 62a after the operation of the setting key 63a, and therefore the pressing by mistake does not directly lead to a problem.

(Advantageous Effect of First Embodiment)

In the first embodiment, the execution key 63b is configured to have a height lower than other setting keys 63a. Therefore, in order to validate the input of the execution key 63b, it is necessary to push the execution key 63b more deeply than other setting keys 63a. Therefore, even if any of the user's fingers 311 touches the execution key 63b by mistake when the user brings the mobile terminal 301 close to the antenna portion 261 for authentication, it is less likely to validate the input of the execution key 63b which leads to a misoperation of the image forming apparatus 100.

In the first embodiment, the execution key 63b is configured to have the same height as or lower height than the surface of the operation panel cover 63c. Therefore, only a touch of any of the user's fingers 311 by mistake does not cause the execution key 63b to be depressed so deeply as to cause the inversion of the output because the depression is obstructed by the operation panel cover 63c, thereby decreasing the likelihood of causing a misoperation related to the image forming action of the image forming apparatus 100 which is caused by a validated input of the execution key 63b.

In the first embodiment, a first pressed surface in a non-pressed state protrudes more than a second pressed surface in a non-pressed state in the opposite direction to the pressing direction. Therefore, the stop key 251 is less likely to interfere with the mobile terminal 301 and the fingers than the keys of the numeric keypad 231 and thus is more unlikely to be erroneously operated than the keys of the numeric keypad 231.

In the first embodiment, the first pressed surface in the non-pressed state is higher than the second pressed surface in the non-pressed state in the opposite direction to the pressing direction regarding the height from the surface of the operation panel cover 63c. For this reason, the stop key 251 is supported by the operation panel cover 63c and is less likely to be operated by mistake with the mobile terminal 301 or fingers than the keys of the numeric keypad 231.

In the first embodiment, the first pressed surface in the non-pressed state protrudes more than the surface of the operation panel cover 63c and the second pressed surface in the non-pressed state is recessed from the surface of the operation panel cover 63c. Therefore, the stop key 251 is less likely to interfere with the mobile terminal 301 and the fingers than the keys of the numeric keypad 231 and is less likely to be operated by mistake than the keys of the numeric keypad 231.

In the first embodiment, a difference in the position in the pressing direction between the first pressed surface in the non-pressed state and the second pressed surface in the non-pressed state is equal to or longer than 0.5 mm and shorter than 1 mm. Accordingly, a misoperation of the stop key 251 can be avoided, while a difference in the height between the stop key 251 and the keys of the numeric keypad 231 is inconspicuous, thus providing an image forming apparatus excellent in design.

[Second Embodiment]

Figure 9:
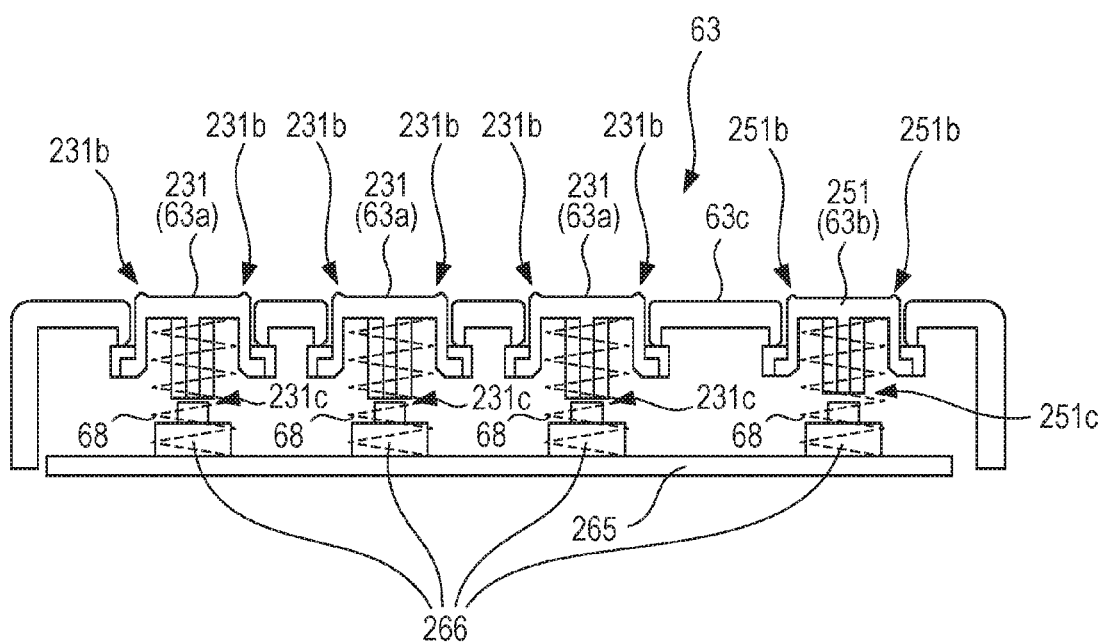
FIG. 9 is a sectional view of an input operation portion according to a second embodiment.

FIG. 9 is a sectional view of an input operation portion according to a second embodiment. In the first embodiment, the height of the pressed surface is different between the keys of the numeric keypad 231 and the stop key 251. Meanwhile, in the second embodiment, a keystroke is different between the keys of the numeric keypad 231 and the stop key 251. The stop key 251 has a longer keystroke than the keystroke of each key of the numeric keypad 231, where the keystroke is a depressed distance to the input of a signal.

As illustrated in FIG. 9, each key of the numeric keypad 231 and the stop key 251 are biased against the operation panel cover 63c with coil springs 68 arranged between each key of the numeric keypad 231 and the operation board 265 and between the stop key 251 and the operation board 265. Therefore, each key of the numeric keypad 231 and the stop key 251 are held with a fixed gap from the tactile switch 266 mounted on the operation board 265. If any key of the numeric keypad 231 or the stop key 251 is pressed downward, the gap is closed and then the tactile switch 266 is pressed by a predetermined distance. Thereby, the output of the tactile switch 266 is inverted and the input of the key of the numeric keypad 231 or the stop key 251 is validated.

The convex portion 231b of any key of the numeric keypad 231 has substantially the same height as the convex portion 251b of the stop key 251. The convex portion 231b of any key of the numeric keypad 231 has the same amount of protrusion from the surface of the operation panel cover 63c as the convex portion 251b of the stop key 251.

A gap 231c between the numeric keypad 231 and the tactile switch 266 is smaller than a gap 251c between the stop key 251 and the tactile switch 266. The keys of the numeric keypad 231 each have a smaller push-in amount (keystroke) up to the height at which a key input is validated than the stop key 251. Therefore, the input of the stop key 251 is less easily validated than the input of the numeric keypad 231.

In the second embodiment, the stop key 251 has a large gap 251c, thereby increasing the depression amount (keystroke) up to the height at which the operation of the stop key 251 is validated from the non-pressed state. The keystroke from the depression of the execution key 63b is started until the input of the execution key 63b is validated is larger than the similar keystroke of the setting key 63a. The keystroke of the setting key 63a, which is a moving distance of the first pressed surface from the non-pressed state of the setting key 63a to an output inversion, is smaller than the keystroke of the execution key 63b, which is a moving distance of the second pressed surface from the non-pressed state of the execution key 63b to an output inversion.

When performing authentication by bringing the mobile terminal 301 close to the antenna portion 261, a user is able to move his/her finger away before the input of the execution key is validated at the time when the user feels a touch of the key with his/her finger, thereby preventing a misoperation of the image forming apparatus 100. Even if any of the user's fingers 311 touches the stop key 251 by mistake when the user performs authentication by bringing the mobile terminal 301 close to the antenna portion 261, the input of the execution key 63b is less likely to be validated. The stop key 251 is provided with a longer distance and time before the validation of the key input than each key of the numeric keypad 231, thereby preventing a misoperation on the image forming apparatus 100.

Note here that, however, when the user presses the stop key 251 for the purpose of stopping the image formation, the user intentionally deeply depresses the stop key 251, and thus the large keystroke up to the height at which the input of the stop key 251 is validated does not lead to a problem.

(Advantageous Effect of Second Embodiment)

In the second embodiment, the gap 251c between the execution key 63b such as the stop key 251 and the tactile switch 266 is large in comparison with the gap 231c between the setting key 63a such as any key of the numeric keypad 231 and the tactile switch 266. Therefore, it is possible to use a common tactile switch 266 between the setting key 63a and the execution key 63b.

A method of increasing the pressing distance (keystroke) up to the height at which the key input on the execution key 63b is validated, however, is not limited to the method of increasing the gap 251c. The keystroke of the tactile switch 266 for the execution key 63b may be larger than the keystroke of the tactile switch 266 for the setting key 63a. The gap 231c and the gap 251c may be set so as to be equal and then the tactile switch 266 just under the execution key 63b may be of the type having a larger keystroke than the tactile switch 266 just under the setting key 63a. In an embodiment having a start key, the keystroke of the start key is also made larger than the keystroke of each key of the numeric keypad 231.

[Third Embodiment]

Figure 10:
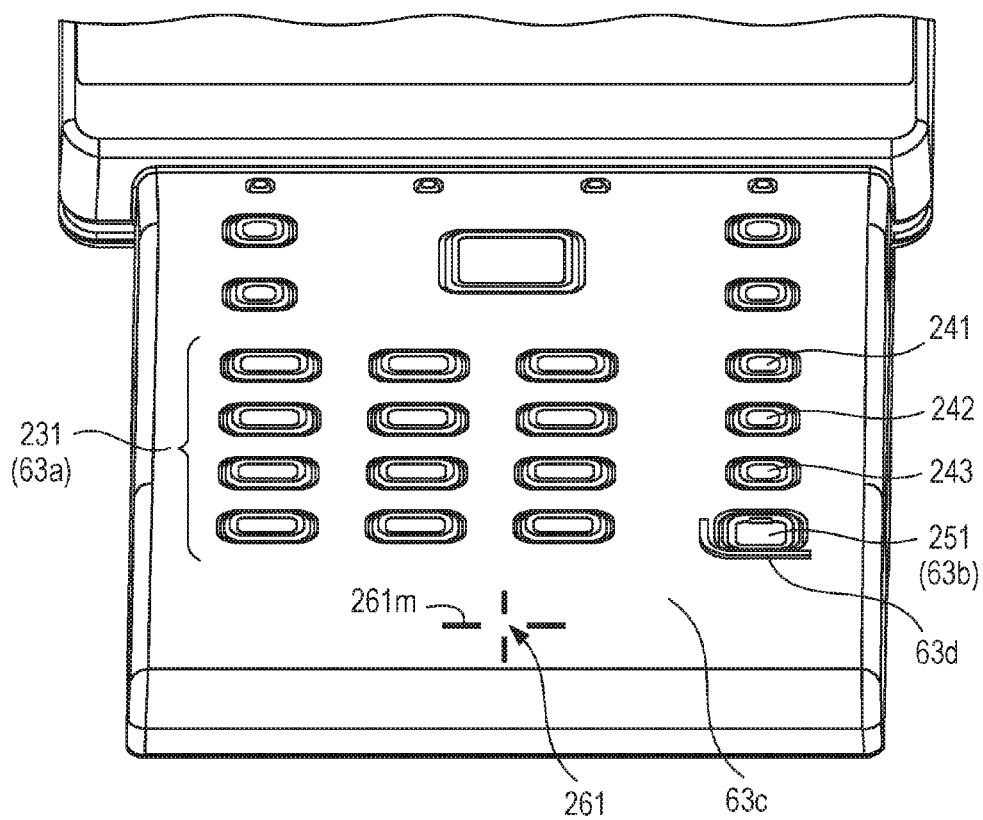
FIG. 10 is a top view of an input operation portion according to a third embodiment.

FIG. 10 is a top view of an input operation portion according to a third embodiment. In the first embodiment, the execution key is made less likely to be depressed by employing different heights between the setting key and the execution key. On the other hand, in the third embodiment, a rib 63d, which is an example of a protrusion, is provided on the surface of the input operation portion 63 adjacent to the stop key 251 on the side where the mobile terminal 301 is brought close to the antenna portion, so that the stop key 251 is less likely to be depressed.

As illustrated in FIG. 10, the keys of the numeric keypad 231 each have the same height as the stop key 251. The keystroke is also the same between each key of the numeric keypad 231 and the stop key 251. There is, however, provided the rib 63d as a misoperation prevention wall which is adjacent to the stop key 251 on the operation panel cover 63c. The rib 63d is provided adjacent to the sides (the front side and the left side) of the stop key 251 facing the mobile terminal 301 which moves toward the antenna portion 261. The rib 63d is provided in such a way as to protect two upright sides (the front side and the left side) of the stop key 251 on the antenna portion 261 side. In the embodiment having the start key, a rib similar to the rib 63d is provided on the surface of the input operation portion 63 adjacent to the start key on the side where the mobile terminal 301 is brought close to the antenna portion.

The height of the rib 63d is higher than at least the key height just before the validation of the key input caused by depressing the stop key 251 from the non-pressed state. Therefore, even if the user touches the stop key 251 by mistake, the user is not able to further depress the stop key 251 because any of user's fingers 311 touches the rib 63d before the input of the stop key 251 is validated. If the user moves the finger 311 away from the rib 63d at the time when the user feels the touch of the rib 63d with the finger 311, the input of the stop key 251 is not validated. Even if the user depresses the stop key 251 by mistake with any of the fingers 311 when performing authentication by bringing the mobile terminal 301 close to the antenna portion 261, further depression is prevented because any of the user's fingers 311 abuts against the rib 63d before the key input is validated. This prevents a misoperation of the image forming apparatus 100 caused by a validated input of the stop key 251.

In the third embodiment, a user's finger touches the rib 63d before the user touches the execution key 63b or, even in the case where the user touches the execution key 63b, before the input of the execution key 63d is validated. Therefore, the user is able to move the finger away from the execution key 63b at the time when the user feels the touch of the rib 63d with the finger.

The depression itself of the stop key 251 may be prevented by increasing the height of the rib 63d so as to be higher than the maximum height of the stop key 251 in the non-pressed state. When performing authentication by bringing the mobile terminal 301 close to the antenna portion 261, any of the user's fingers 311 abuts against the rib 63d before the user's finger 311 touches the stop key 251 by mistake, by which the stop key 251 is not depressed. The higher the rib 63d is, the less the depression of the stop key 251 is likely to occur. The increase in the height of the rib 63d, however, might impair the operability of the stop key 251 and the design quality of the input operation portion 63.

From the viewpoint of preventing a misoperation of the stop key 251, the entire periphery of the stop key 251 may be enclosed by a wall-like rib. When attempting to intentionally operate the stop key 251 for the purpose of stopping the image formation, however, the user occasionally fails to depress the stop key 251 because the rib lies in the way. Therefore, as illustrated in FIG. 10, it is also preferable to provide the rib 63*d* only on the antenna portion 261 side of the periphery of the stop key 251.

The third embodiment may be combined with the first or second embodiment. The height of the stop key 251 may be lower than the height of each key of the numeric keypad 231 and the keystroke of the stop key 251 may be larger than the keystroke of each key of the numeric keypad 231.

[Other Embodiments]

Figure 11:
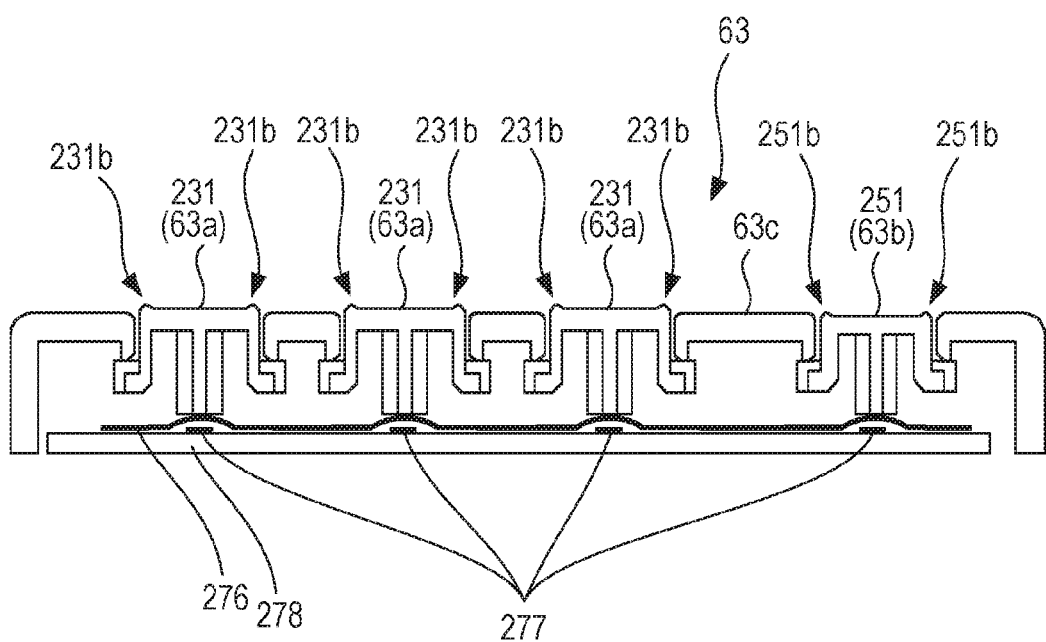
FIG. 11 is an explanatory diagram illustrating another structure of a key switch.

The present invention is not limited to the specific configurations described in the first, second, and third embodiments. An embodiment generated by replacing some or all of the first, second, and third embodiments with another alternative configuration may be enabled. FIG. 11 is an explanatory diagram illustrating another example of the structure of a key switch. As illustrated in FIG. 11, the stop key 251 and each key of the numeric keypad 231 may be each formed of a conductive rubber sheet 276 connected to the ground potential and a switch contact 277 provided on a switch board 278.

The communication components can be implemented by various types of devices that can be authenticated by wireless communication, such as a digital camera, a video camera, a mobile phone, a smartphone, a tablet terminal, a wireless communication unit, a personal digital assistant (PDA), a remote-control unit, and the like. The authentication medium may be implemented by a card medium not having a power supply using an IC tag.

Although the embodiments in the electrophotographic image forming apparatus 100 have been described in the first, second, and third embodiments, the image forming portion capable of forming an image on a recording medium is not limited to one in the electrophotographic image forming apparatus. Even an image forming apparatus using another recording system or printing system such as an inkjet recording system can implement the present invention.

Since the embodiments of a printer are described in the first, second, and third embodiments, the execution key 63*b* is only the stop key 251. The present invention, however, can be implemented by a complex machine having a copier, a facsimile machine, and a scanner function. In that case, the start key may be located next to the stop key 251 in the vicinity thereof (for example, to the left), though the start key is displayed on the liquid crystal screen 62*a* in the first, second, and third embodiments. In that case, two keys, namely the added start key and the stop key 251 are execution keys 63*b*.

In the first, second, and third embodiments, the operation portion 61 is vertically long and therefore there are arranged the liquid crystal screen 62*a* which is a display portion, the input operation portion 63, and the antenna portion 261, which performs authentication, in sequence from the rear side. The operation portion 61, however, may be horizontally long. In this case, from the viewpoint of human engineering, it is preferable to arrange the liquid crystal screen 62*a*, the input operation portion 63, and the antenna portion 261 in order thereof from the left. Also in this case, the execution key 63*b* is arranged nearest to the antenna portion 261 in the same manner.

The first, second, and third embodiments may be singly implemented or two or three of the embodiments may be implemented in combination. For example, it is possible to use an embodiment in which a small difference in the amount of protrusion, a small difference in the keystroke, and a rib having a low height are used at a time, with respect to the execution key 63*b* and the setting key 63*a*.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-140518, filed Jul. 14, 2015, which is hereby incorporated by reference herein in its entirety.

What is claimed is:

1. An image forming apparatus comprising:
an image forming portion capable of forming an image on a recording medium;
an operation portion for performing an operation of the image forming apparatus;
a first push button which is arranged in a surface of the operation portion, and with which a signal of stopping an image forming action performed by the image forming portion is input;
a second push button which is arranged in the surface of the operation portion, and with which information relating to numerals is input; and
a receiving portion provided in the operation portion so as to be able to receive a radio signal from a communication component by placing the communication component transmitting the radio signal so as to face the receiving portion,
wherein at least a central portion of the first push button is located at a position recessed from the surface of the operation portion,
wherein a central portion of the second push button is higher than the central portion of the first push button in a direction of protruding from the surface of the operation portion,
wherein the central portion of the second push button is located at a position protruding more than the surface of the operation portion, and
wherein a portion of the surface of the operation portion in which the first push button is arranged and a portion of the surface of the operation portion in which the second push button is arranged are at a same level.

2. The image forming apparatus according to claim 1, wherein a keystroke of the first push button is larger than a keystroke of the second push button.

3. The image forming apparatus according to claim 1, wherein the receiving portion is provided nearer an edge of the operation portion than the first push button and the second push button.

4. The image forming apparatus according to claim 1, wherein a portion around the central portion of the first push button protrudes more than the central portion of the first push button, and the portion around the central portion of the first push button is located at a position flush with or recessed from the surface of the operation portion.

5. The image forming apparatus according to claim 1, further comprising a third push button for turning on or off a power supply of the image forming apparatus.

6. An image forming apparatus comprising:
an image forming portion capable of forming an image on a recording medium;

an operation portion for performing an operation of the image forming apparatus;
a first push button which is arranged in a surface of the operation portion, and with which a signal of starting an image forming action performed by the image forming portion is input;
a second push button which is arranged in the surface of the operation portion, and with which information relating to numerals is input; and
a receiving portion provided in the operation portion so as to be able to receive a radio signal from a communication component by placing the communication component transmitting the radio signal so as to face the receiving portion,
wherein at least a central portion of the first push button is located at a position recessed from the surface of the operation portion,
wherein a central portion of the second push button is higher than the central portion of the first push button in a direction of protruding from the surface of the operation portion,
wherein the central portion of the second push button is located at a position protruding more than the surface of the operation portion, and
wherein a portion of the surface of the operation portion in which the first push button is arranged and a portion of the surface of the operation portion in which the second push button is arranged are at a same level.

7. The image forming apparatus according to claim 6, wherein a keystroke of the first push button is larger than a keystroke of the second push button.

8. The image forming apparatus according to claim 6, wherein the receiving portion is provided nearer an edge of the operation portion than the first push button and the second push button.

9. The image forming apparatus according to claim 6, wherein a portion around the central portion of the first push button protrudes more than the central portion of the first push button, and the portion around the central portion of the first push button is located at a position flush with or recessed from the surface of the operation portion.

10. The image forming apparatus according to claim 6, further comprising a third push button for turning on or off a power supply of the image forming apparatus.

* * * * *